United States Patent
Kim et al.

(10) Patent No.: US 8,516,327 B2
(45) Date of Patent: Aug. 20, 2013

(54) METHOD AND APPARATUS FOR PERFORMING HARQ IN A MULTIPLE ANTENNA SYSTEM

(75) Inventors: So Yeon Kim, Anyang-si (KR); Hyun Soo Ko, Anyang-si (KR); Jae Hoon Chung, Anyang-si (KR); Moon Il Lee, Anyang-si (KR)

(73) Assignee: LG Electronics Inc., Seoul (KR)

( * ) Notice: Subject to any disclaimer, the term of this patent is extended or adjusted under 35 U.S.C. 154(b) by 231 days.

(21) Appl. No.: 12/991,692

(22) PCT Filed: May 20, 2009

(86) PCT No.: PCT/KR2009/002655
§ 371 (c)(1),
(2), (4) Date: Nov. 8, 2010

(87) PCT Pub. No.: WO2009/142436
PCT Pub. Date: Nov. 26, 2009

(65) Prior Publication Data
US 2011/0051824 A1 Mar. 3, 2011

Related U.S. Application Data

(60) Provisional application No. 61/076,146, filed on Jun. 27, 2008, provisional application No. 61/054,814, filed on May 21, 2008.

(30) Foreign Application Priority Data

Feb. 2, 2009 (KR) .......................... 10-2009-0008015

(51) Int. Cl.
*H04L 1/18* (2006.01)

(52) U.S. Cl.
USPC ............................ 714/749; 714/751; 714/776

(58) Field of Classification Search
USPC .................... 714/749, 751, 748, 776, 750
See application file for complete search history.

(56) References Cited

U.S. PATENT DOCUMENTS

| | | | | |
|---|---|---|---|---|
| 7,693,125 B2 * | 4/2010 | Ihm et al. | ...................... | 370/343 |
| 7,889,708 B2 * | 2/2011 | Ihm et al. | ...................... | 370/343 |
| 8,234,535 B2 * | 7/2012 | Parkvall et al. | ............... | 714/750 |
| 8,243,673 B2 * | 8/2012 | Hoshino | ...................... | 370/329 |
| 2001/0017647 A1 * | 8/2001 | Kodama | ........................ | 347/234 |
| 2006/0153060 A1 | 7/2006 | Cho | | |

FOREIGN PATENT DOCUMENTS

| | | |
|---|---|---|
| KR | 10-2006-0074014 A | 6/2006 |
| KR | 10-0788897 B1 | 12/2007 |
| KR | 10-2008-0088127 A | 10/2008 |
| KR | 10-2009-0084996 A | 8/2009 |
| WO | 2007/105904 A2 | 9/2007 |

\* cited by examiner

*Primary Examiner* — Fritz Alphonse
(74) *Attorney, Agent, or Firm* — Lee, Hong, Degerman, Kang & Waimey

(57) ABSTRACT

A method of performing hybrid automatic repeat request (HARQ) in a multiple-antenna system includes receiving a plurality of codewords through an uplink channel, generating acknowledgment (ACK)/not-acknowledgment (NACK) signals respectively for the plurality of codewords, and transmitting the plurality of ACK/NACK signals through a downlink channel in association with a resource used in transmission of the uplink channel. ACK/NACK signals for each codeword in multiple antenna system can be transmitted.

4 Claims, 17 Drawing Sheets

METHOD AND APPARATUS FOR PERFORMING HARQ IN A MULTIPLE ANTENNA SYSTEM

CROSS-REFERENCE TO RELATED APPLICATIONS

This application is the National Stage filing under 35 U.S.C. §371 of International Application No. PCT/KR2009/002655, filed on May 20, 2009, which claims the benefit of earlier filing date and right of priority to Korean Application No. 10-2009-0008015, filed on Feb. 2, 2009, and also claims the benefit of U.S. Provisional Application Ser. Nos. 61/076,146, filed on June 27, 2008, and 61/054,814, filed on May 21, 2008, the contents of which are all incorporated by reference herein in their entireties.

TECHNICAL FIELD

The present invention relates to wireless communications, and more particularly, to a method and apparatus for performing hybrid automatic repeat request (HARQ) in a multiple-antenna system.

BACKGROUND ART

A multiple input multiple output (MIMO) scheme is used to increase system capability in such a manner that a base station (BS) and/or a user equipment (UE) spatially transmit several data streams simultaneously by using two or more transmit (Tx) antennas. Transmit diversity enables data transmission with high reliability in a fast time-variant channel by transmitting the same stream through a plurality of Tx antennas. Spatial multiplexing increases system capability by transmitting different data streams through a plurality of Tx antennas.

Spatial multiplexing for a single user is called single user-MIMO (SU-MIMO). Channel capacity of the MIMO system increases in proportion to a minimum value between the number of Tx antennas and the number of receive (Rx) antennas. Spatial multiplexing for multiple users is called spatial division multiple access (SDMA) or multi user-MIMO (MU-MIMO).

A single codeword (SCW) mechanism and a multiple codeword (MCW) mechanism can be used in the spatial multiplexing. The SCW mechanism transmits N (N>1) data streams, which are transmitted simultaneously, by using one codeword. The MCW mechanism transmits N data streams by using M (M≦N) codewords. Each codeword is generated by separate channel encoding so that error detection can be performed separately.

Long-term evolution (LTE) is currently under study in the $3^{rd}$ generation partnership project (3GPP) and is one of the latest standards of mobile communication techniques. Wireless access of the LTE is called an evolved-UMTS terrestrial radio access network (E-UTRAN). The LTE supports multiple antennas, and can support both SU-MIMO and MU-MIMO. Further, the LTE supports hybrid automatic repeat request (HARQ) in both uplink transmission and downlink transmission. Downlink HARQ implies that, when the BS transmits downlink data, the UE transmits an ACK/NACK signal for the downlink data. Uplink HARQ implies that, when the UE transmits uplink data, the BS transmits an ACK/NACK signal for the uplink data.

To transmit the ACK/NACK signal for the uplink data, the LTE system defines a physical hybrid-ARQ indicator channel (PHICH). According to a current LTE system, the uplink HARQ uses only the SCW mechanism and does not support the MCW mechanism. Therefore, the PHICH is designed such that only one ACK/NACK signal is provided for one uplink data (i.e., codeword). This implies that the uplink HARQ cannot support SU-MIMO according to the existing LTE system.

As uplink transmission requires a higher transmission capacity and a higher data rate and also as the UE can use a more number of Tx antennas, it becomes necessary for uplink transmission to support SU-MIMO. A method of transmitting or receiving an acknowledgment (ACK)/not-acknowledgment (NACK) signal for multiple codewords needs to be taken into account in order to perform uplink HARQ in SU-MIMO.

DISCLOSURE

Technical Problem

The present invention provides a method and apparatus for performing hybrid automatic repeat request (HARQ) in a multiple-antenna system.

The present invention also provides a method and apparatus for transmitting an acknowledgment (ACK)/not-acknowledgment (NACK) signal for multiple codewords.

Technical Solution

In an aspect, a method of performing hybrid automatic repeat request (HARQ) in a multiple-antenna system includes receiving a plurality of codewords through an uplink channel, generating acknowledgment (ACK)/not-acknowledgment (NACK) signals respectively for the plurality of codewords, and transmitting the plurality of ACK/NACK signals through a downlink channel in association with a resource used in transmission of the uplink channel.

The plurality of ACK/NACK signals may be transmitted on one downlink channel. The plurality of ACK/NACK signals may be transmitted on a plurality of downlink channels.

The downlink channel may be a physical hybrid-ARQ indicator channel (PHICH). The uplink channel may be a physical uplink shared channel (PUSCH).

Advantageous Effects

An acknowledgment (ACK)/not-acknowledgment (NACK) signal can be transmitted for each of a plurality of codewords in a multiple-antenna system. Therefore, system capacity can be increased, and transmission reliability can be improved.

DESCRIPTION OF DRAWINGS

FIG. 10 shows an example of resource mapping when SF=4.

FIG. 11 shows an example of resource mapping when SF=8.

FIG. 12 shows an example of resource mapping when SF=4.

FIG. 13 shows an example of resource mapping when SF=2.

FIG. 15 shows an example of resource mapping when SF=8.

FIG. 16 shows an example of resource mapping when SF=4.

MODE FOR INVENTION

Figure 1:
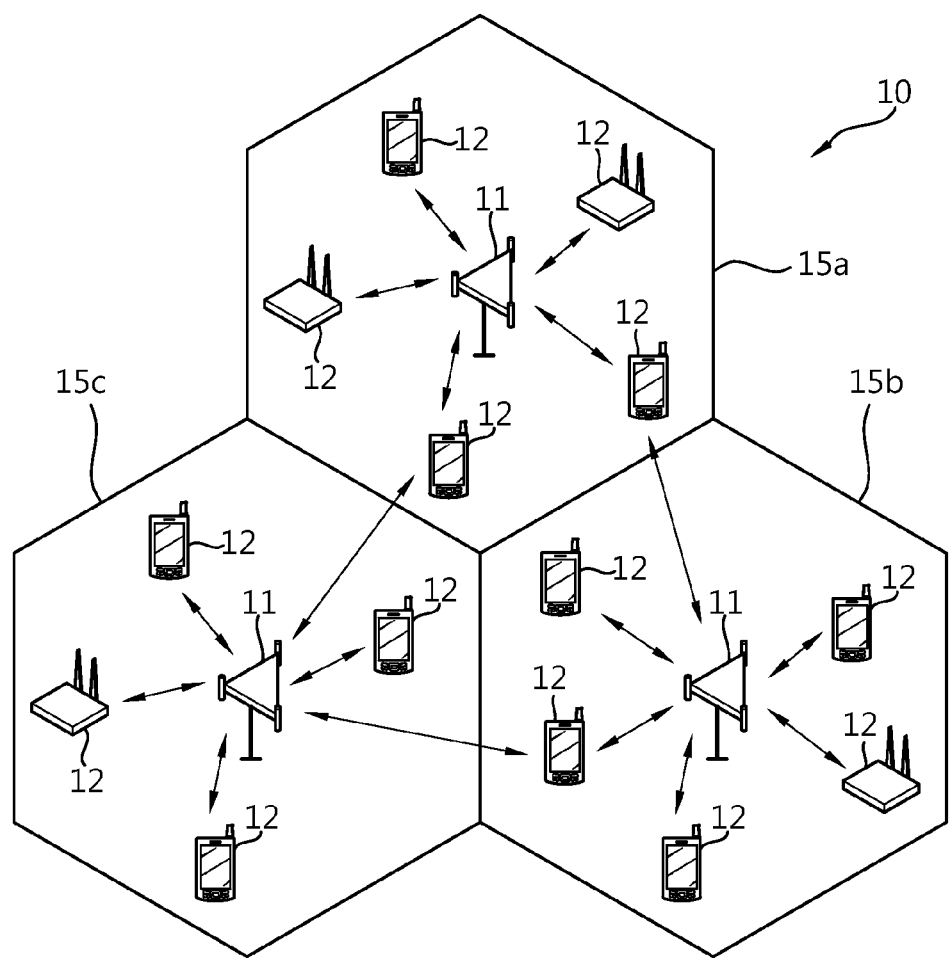
FIG. 1 shows a wireless communication system.

FIG. 1 shows a wireless communication system. A wireless communication system 10 includes at least one base station (BS) 11. Respective BSs 11 provide communication services to specific geographical regions (generally referred to as cells) 15a, 15b, and 15c. The cell can be divided into a plurality of regions (referred to as sectors). A user equipment (UE) 12 may be fixed or mobile, and may be referred to as another terminology, such as a mobile station (MS), a user terminal (UT), a subscriber station (SS), a wireless device, a personal digital assistant (PDA), a wireless modem, a handheld device, etc. The BS 11 is generally a fixed station that communicates with the UE 12 and may be referred to as another terminology, such as an evolved node-B (eNB), a base transceiver system (BTS), an access point, etc.

Figure 2:
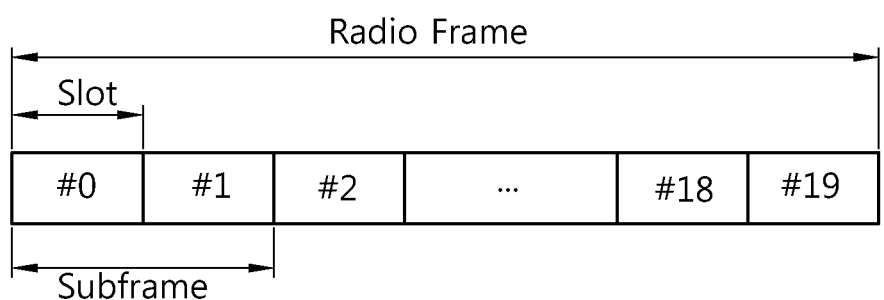
FIG. 2 shows a structure of a radio frame in $3^{rd}$ generation partnership project (3GPP) long-term evolution (LTE).

FIG. 2 shows a structure of a radio frame in $3^{rd}$ generation partnership project (3GPP) long-term evolution (LTE). The radio frame consists of 10 subframes. One subframe consists of 2 slots. A time required for transmitting one subframe is defined as a transmission time interval (TTI). For example, one subframe may have a length of 1 millisecond (ms), and one slot may have a length of 0.5 ms.

One slot includes a plurality of orthogonal frequency-division multiplexing (OFDM) symbols in a time domain and includes a plurality of resource blocks (RBs) in a frequency domain. Since the 3GPP LTE uses orthogonal frequency-division multiple access (OFDMA) in downlink, the OFDM symbol is for representing one symbol period, and can be referred to as an SC-FDMA symbol or a symbol period according to a system. The RB includes a plurality of contiguous subcarriers in one slot in a resource assignment unit.

The structure of the radio frame is for exemplary purpose only, and the number of subframes included in the radio frame or the number of slots included in the subframe and the number of OFDM symbols included in the slot can change variously.

Figure 3:
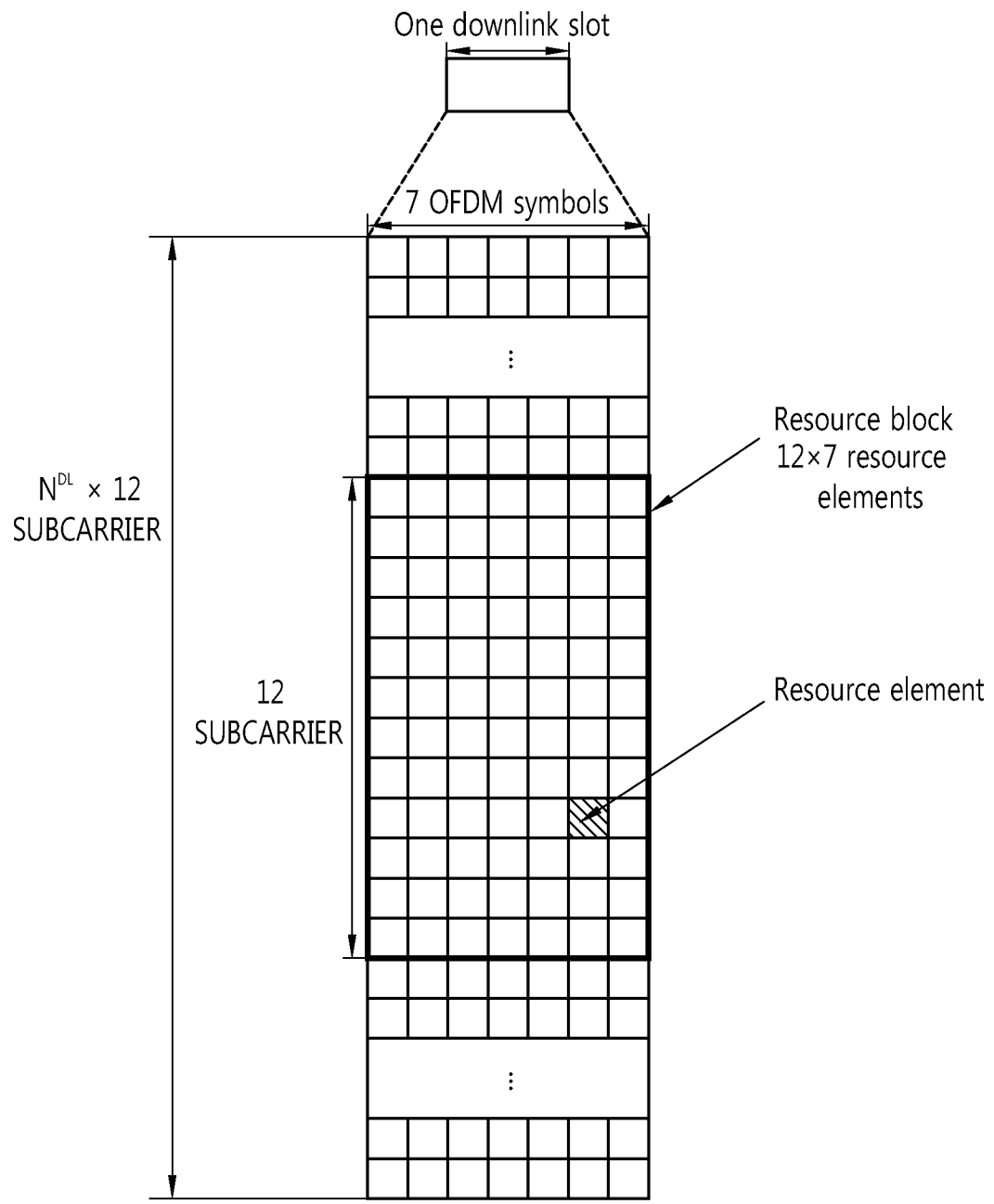
FIG. 3 is a diagram showing an example of a resource grid for one downlink slot.

FIG. 3 is a diagram showing an example of a resource grid for one downlink slot. The downlink slot includes a plurality of OFDM symbols in a time domain. Although it is described herein that one downlink slot includes 7 OFDM symbols and one resource block includes 12 subcarriers, the present invention is not limited thereto. Each element on the resource grid is referred to as a resource element. One resource block includes 12×7 resource elements. The number $N^{DL}$ of resource blocks included in the downlink slot depends on a downlink bandwidth defined in a cell.

Figure 4:
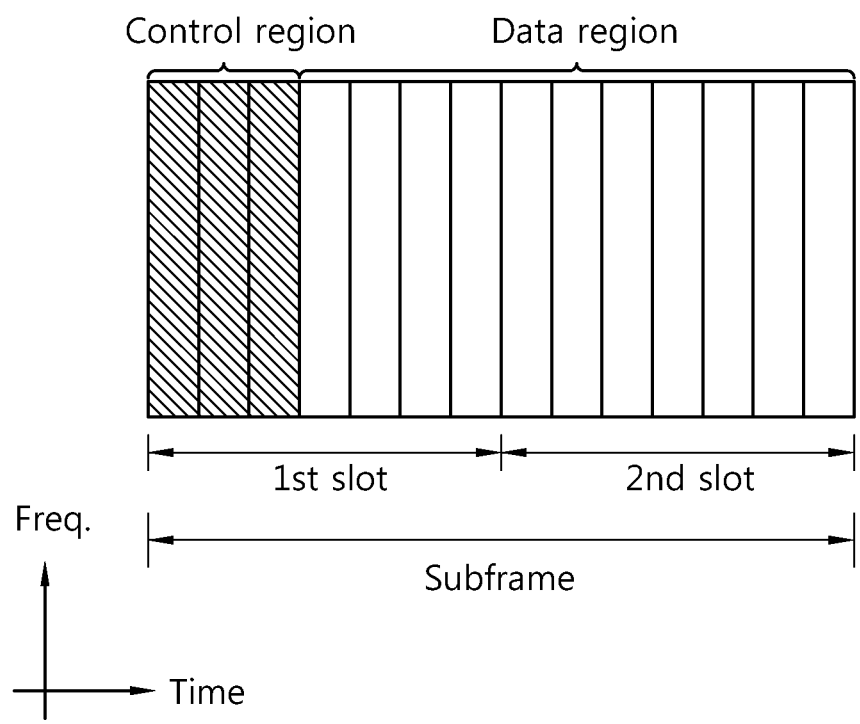
FIG. 4 shows an example of a downlink subframe structure.

FIG. 4 shows an example of a downlink subframe structure. A subframe includes two slots. Up to three preceding OFDM symbols of a $1^{st}$ slot in the subframe correspond to a control region. Control channels are assigned to the control region. The remaining OFDM symbols correspond to a data region. A physical downlink shared channel (PDSCH) is assigned to the data region.

Examples of downlink control channels used in 3GPP LTE include a physical control format indicator channel (PCFICH), a physical downlink control channel (PDCCH), a physical hybrid-ARQ indicator channel (PHICH), etc. The PCFICH transmitted in a $1^{st}$ OFDM symbol of the subframe carries information regarding the number of OFDM symbols used for transmission of the control channels in the subframe. Control information transmitted on the PDCCH is referred to as downlink control information (DCI). The DCI transmits uplink or downlink scheduling information or an uplink transmit power control command for any UE groups.

The wireless communication system can support uplink and/or downlink hybrid automatic repeat request (HARQ).

Figure 5:
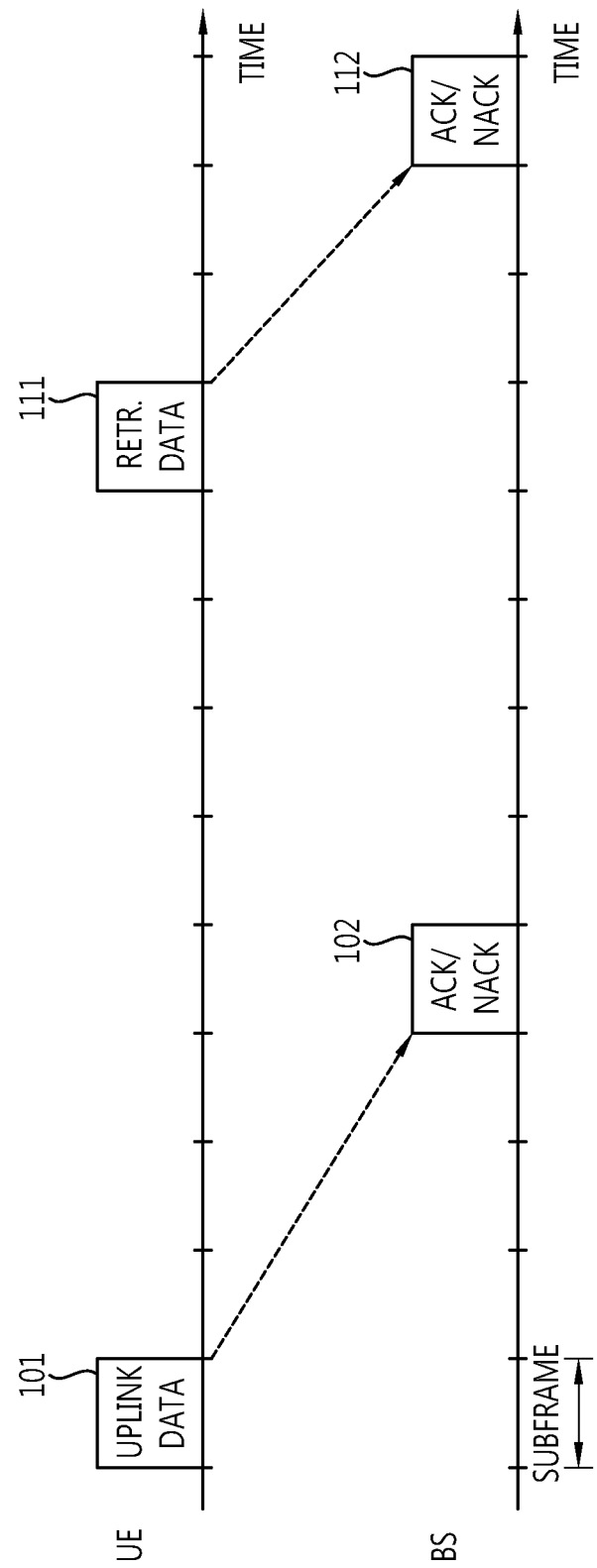
FIG. 5 shows uplink hybrid automatic repeat request (HARQ).

FIG. 5 shows uplink HARQ. Upon receiving uplink data 101 from a UE through a physical uplink shared channel (PUSCH), a BS transmits an acknowledgement (ACK)/not-acknowledgement (NACK) signal 102 through a PHICH after a specific time elapses. The ACK/NACK signal 102 corresponds to an ACK signal when the uplink data 101 is successfully decoded, and corresponds to a NACK signal when the uplink data 101 fails in decoding. Upon receiving the NACK signal, the UE can transmit retransmission data 111 for the uplink data 101 until ACK information is received or until up to a maximum number of retransmission attempts. The BS can transmit an ACK/NACK signal 112 for the retransmission data 111 through the PHICH.

Figure 6:
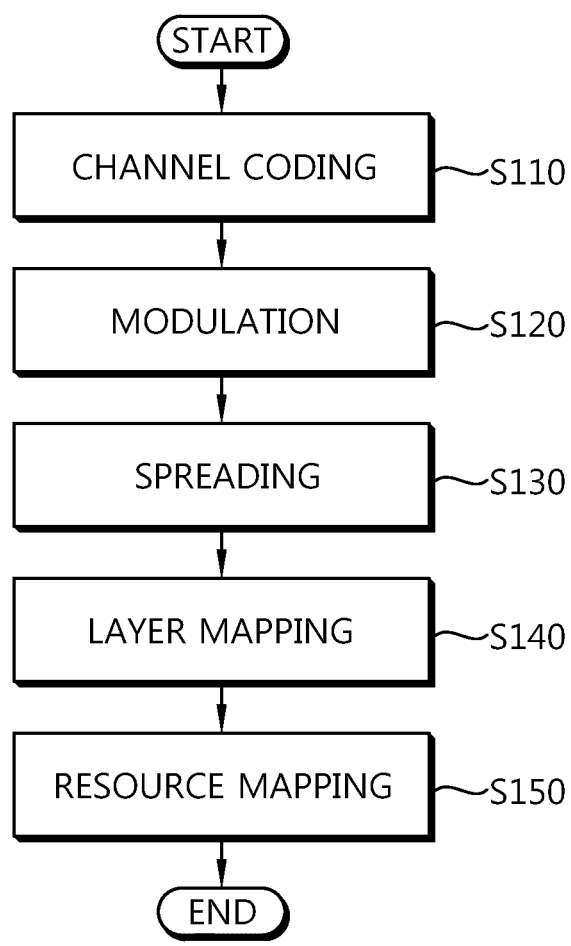
FIG. 6 is a flowchart showing a configuration of a physical hybrid-ARQ indicator channel (PHICH).

FIG. 6 is a flowchart showing a configuration of a PHICH. The section 6.9 of 3GPP TS 36.211 V8.2.0 (2008-03) "Technical Specification Group Radio Access Network; Evolved Universal Terrestrial Radio Access (E-UTRA); Physical Channels and Modulation (Release 8)" can be incorporated herein by reference.

Referring to FIG. 6, since an LTE system does not support SU-MIMO in uplink, the PHICH carries a 1-bit ACK/NACK signal corresponding to a PUSCH for one UE. This implies that multi-codeword transmission is not supported in uplink transmission. In step S210, the 1-bit ACK/NACK signal is subjected to channel coding by using repetition coding at a code rate 1/3. In step S220, the ACK/NACK signal coded with a 3-bit codeword is mapped to 3 modulation symbols through binary phase shift keying (BPSK). In step S230, the modulation symbols are spread by using a spreading factor (SF) $N^{PHICH}_{SF}$ and an orthogonal sequence. The number of orthogonal sequences used in the spreading is double of $N^{PHICH}_{SF}$ to apply I/Q multiplexing. $2N^{PHICH}_{SF}$ PHICHs which are spread by using $2N^{PHICH}_{SF}$ orthogonal sequences are defined as one PHICH group. PHICHs belonging to the same PHICH group are identified using different orthogonal sequences. In step S240, layer mapping is performed on the spread symbols according to a rank. In step S250, the layer-mapped symbols are mapped to respective resource elements.

According to the section 6.9 of 3GPP TS 36.211 V8.2.0 (2008-03), a PHICH resource corresponding to a PUSCH is defined by using $I^{lowest\_index}_{PRB\_RA}$ which is the lowest physical resource block (PRB) index of a resource used in the PUSCH and $n_{DMRS}$ which is a cyclic shift of a data demodulation reference signal (DMRS) used in the PUSCH. The DMRS is a reference signal used for demodulation of data transmitted on the PUSCH. More specifically, the PHICH resource is known by an index pair $(n^{group}_{PHICH}, n^{seq}_{PHICH})$.

$n^{group}_{PHICH}$ denotes a PHICH group number, and $n^{seq}_{PHICH}$ denotes an orthogonal sequence index in the PHICH group. $n^{group}_{PHICH}$ and $n^{seq}_{PHICH}$ are given by the following equation.

$$n_{PHICH}^{group} = (I_{PRB\_RA}^{lowest\_index} + n_{DMRS}) \bmod N_{PHICH}^{group}$$

$$n_{PHICH}^{seq} = (\lfloor I_{PRB\_RA}^{lowest\_index} / N_{PHICH}^{group} \rfloor + n_{DMRS}) \bmod 2N_{SF}^{PHICH}$$

[Equation 1]

Herein, 'mod' denotes a modulo operation.

$n^{group}_{PHICH}$ has a value between 0 and ($N^{group}_{PHICH}-1$), and the PHICH group number $N^{group}_{PHICH}$ is defined by the following equation.

$$N_{PHICH}^{group} = \begin{cases} \lceil N_g (N_{RB}^{DL}/8) \rceil & \text{for normal cyclic prefix} \\ 2 \cdot \lceil N_g (N_{RB}^{DL}/8) \rceil & \text{for extended cyclic prefix} \end{cases}$$

[Equation 2]

Herein, $N_g \in \{1/6, 1/2, 1, 2\}$ is defined in a higher layer.

An orthogonal sequence used in the PHICH is shown in the following table.

TABLE 1

| Sequence index $n_{PHICH}^{seq}$ | Orthogonal sequence Normal cyclic prefix $N_{SF}^{PHICH}=4$ | Extended cyclic prefix $N_{SF}^{PHICH}=2$ |
|---|---|---|
| 0 | [+1 +1 +1 +1] | [+1 +1] |
| 1 | [+1 −1 +1 −1] | [+1 −1] |
| 2 | [+1 +1 −1 −1] | [+j +j] |
| 3 | [+1 −1 −1 +1] | [+j −j] |
| 4 | [+j +j +j +j] | — |
| 5 | [+j −j +j −j] | — |
| 6 | [+j +j −j −j] | — |
| 7 | [+j −j −j +j] | — |

Figure 7:
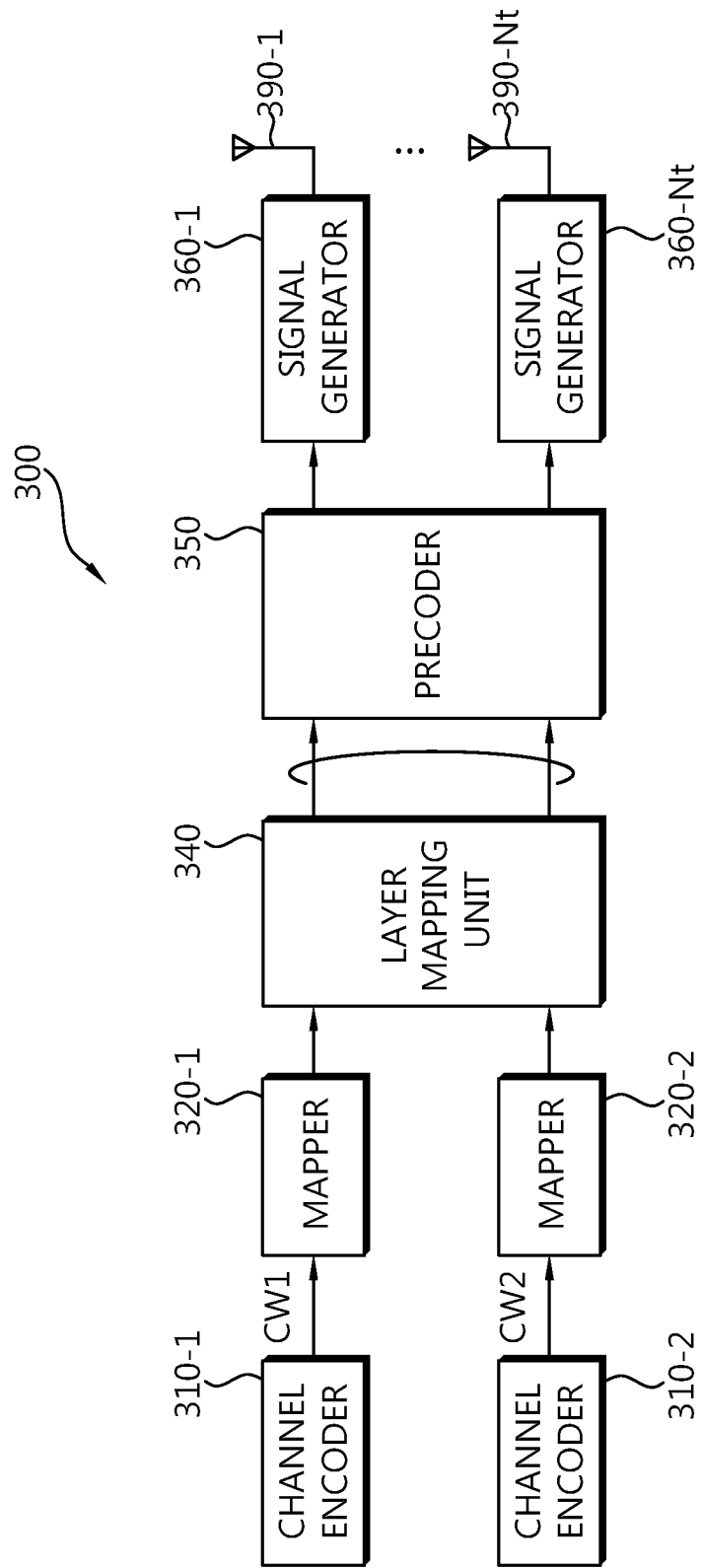
FIG. 7 shows a transmitter supporting a multiple codeword (MCW) mechanism.

FIG. 7 shows a transmitter supporting a multiple codeword (MCW) mechanism.

Referring to FIG. 7, a transmitter 300 includes channel encoders 310-1 and 310-2, mappers 320-1 and 320-2, a layer mapping unit 340, a precoder 350, and signal generators 360-1, . . . , 360-Nt. Nt denotes the number of antenna ports. The channel encoders 310-1 and 310-2 generate a codeword (CW) by encoding input information bits according to a predetermined coding scheme. The first channel encoder 310-1 generates a first codeword (CW1) and the second channel encoder 310-2 generates a second codeword (CW2).

The mappers 320-1 and 320-2 modulate the respective CWs according to a modulation scheme and map the CWs to complex-valued modulation symbols. The first mapper 320-1 generates modulation symbols for the CW1, and the second mapper 320-2 generates modulation symbols for the CW2.

The layer mapping unit 340 maps modulation symbols of the input codewords, i.e., the CW1 and the CW2, to respective layers according to the number of layers. The layer can be an information path input to the precoder 350, and corresponds to a rank value. The layer mapping unit 340 may determine the number of layers (i.e., rank) and thereafter map the modulation symbols of the CWs to the respective layers. The precoder 350 processes mapping symbols mapped to the respective layers according to a MIMO scheme based on a plurality of antenna ports 390-1, . . . ,390-Nt, and outputs an antenna-specific symbol. The signal generators 360-1, . . . ,360-Nt convert the antenna-specific symbol to a transmission signal. The transmission signal is transmitted through each of the antenna ports 390-1, . . . ,390-Nt. The signal generators 360-1, . . . ,160-Nt may perform OFDM modulation.

Although the transmitter 300 includes the two channel encoders 310-1 and 310-2 and the two mappers 320-1 and 320-2 to process the two CWs, the number of channel encoders and the number of mappers are not limited thereto. The transmitter 300 may include a plurality of channel encoders and a plurality of mappers to process a plurality of CWs.

Figure 8:
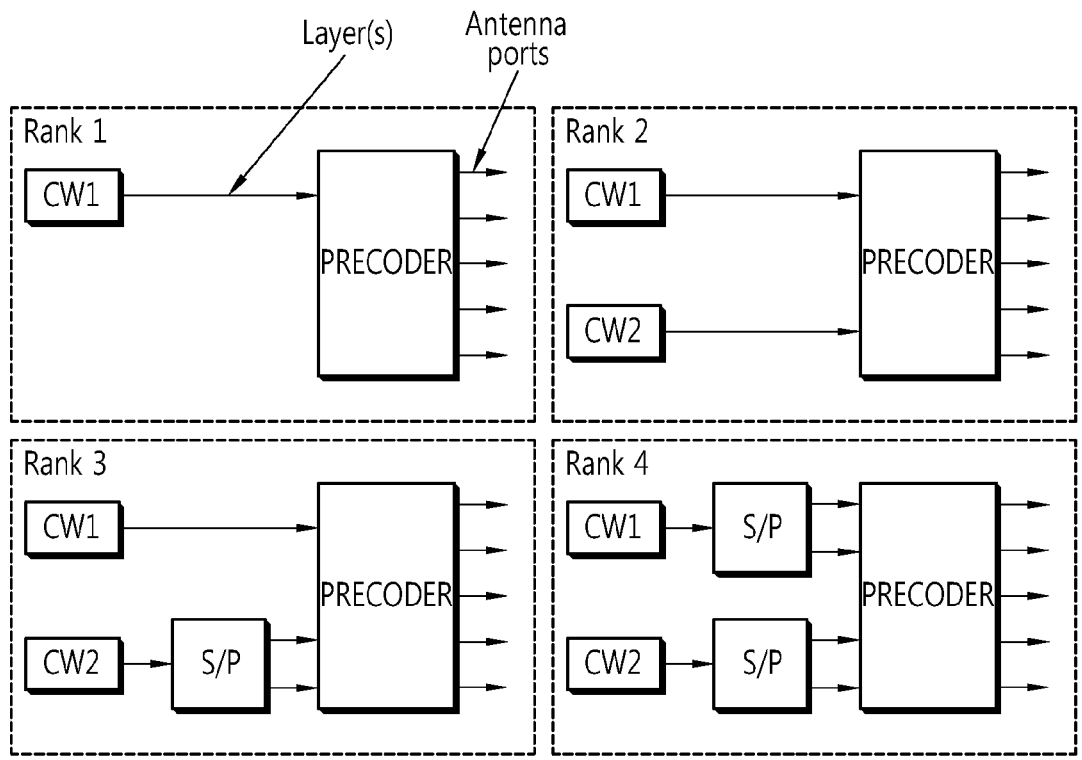
FIG. 8 shows codeword-layer mapping in 3GPP LTE.

FIG. 8 shows codeword-layer mapping in 3GPP LTE. The section 6.3 of 3GPP TS 36.211 V8.2.0 (2008-03) can be incorporated herein by reference. If a rank is 1, one codeword, i.e., CW1, is mapped to one layer. Precoding is used to transmit one layer through 4 antenna ports. If the rank is 2, two codewords, i.e., CW1 and CW2, are mapped to two layers, and are mapped to 4 antenna ports by a precoder. If the rank is 3, one of the two codewords, i.e., CW1 and CW2, is mapped to two layers by a serial-to-parallel (S/P) converter, and thus two codewords are mapped to 3 layers. If the rank is 4, the two codewords, i.e., CW1 and CW2, are respectively mapped to two layers by the S/P converter. Since a transmitter having 4 antennas can have up to 4 layers, the transmitter can transmit 4 independent codewords. However, in 3GPP LTE, the maximum number of supportable codewords is 2. Therefore, when each codeword has an independent HARQ process, up to 2 independent HARQ processes can be performed.

According to 3GPP TS 36.211 V8.2.0 (2008-03), the configuration of the PHICH for PUSCH transmission does not consider SU-MIMO in uplink. This is because multi-codeword transmission is not defined in uplink. Only an ACK/NACK signal for one codeword is transmitted on the PHICH, and SU-MIMO for multi-codeword transmission is not taken into account in the designing of the PHICH. Therefore, there is a need for a method capable of transmitting an ACK/NACK signal for multiple codewords when the multiple codewords are transmitted on the PUSCH in uplink SU-MIMO.

<Joint Coding>

Hereinafter, a method capable of transmitting a plurality of ACK/NACK signals through a PHICH by performing joint coding on the respective ACK/NACK signals for multiple codewords will be described.

In order to minimize changes from the existing LTE system, a PHICH group number $n^{group}_{PHICH}$ and an orthogonal sequence index $n^{seq}_{PHICH}$ used for spreading in a PHICH group are used to assign PHICH resources. Likewise, the orthogonal sequence index $n^{seq}_{PHICH}$ is determined by using $I^{lowest\_index}_{PRB\_RA}$ which is the lowest PRB index of a resource used in a PUSCH and $n_{DMRS}$ which is a cyclic shift of a DMRS used for the PUSCH. When using the joint coding, n ACK/NACK signals for n codewords are transmitted on one PHICH. For SU-MIMO, the $I^{lowest\_index}_{PRB\_RA}$ can be used in the same concept even if the n codewords are transmitted on the PUSCH. The reason of using the cyclic shift $n_{DMRS}$ of the DMRS in PHICH assignment is that the PHICH resources cannot be identified only with the $I^{lowest\_index}_{PRB\_RA}$ because the same RB may be simultaneously used by a plurality of UEs in uplink MU-MIMO. Therefore, in uplink SU-MIMO, since only one PHICH resource can be assigned when using the joint coding without having to assign the PHICH resources for respective codewords, the PHICH resources can be assigned by using a similar method of the existing LTE system.

Figure 9:
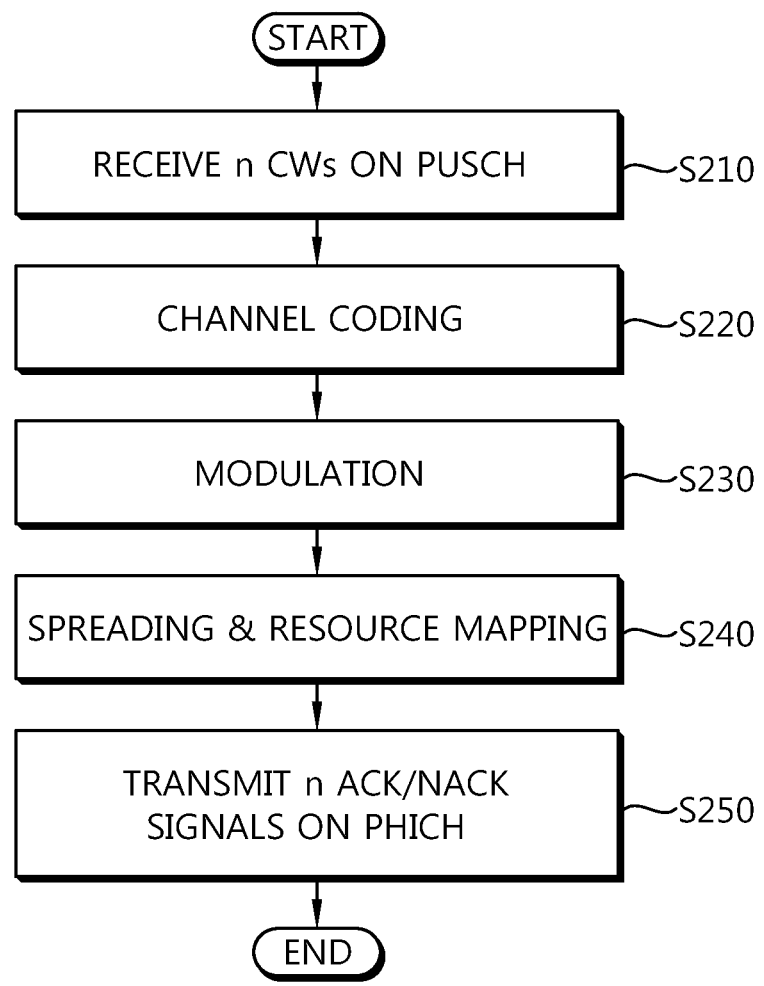
FIG. 9 is a flowchart showing a method of performing HARQ according to an embodiment of the present invention.

FIG. 9 is a flowchart showing a method of performing HARQ according to an embodiment of the present invention. This method can be performed by a BS.

Referring to FIG. 9, in step S510, the BS receives n (n>1) codewords (CWs) from a UE through a PUSCH.

In step S520, the BS performs channel coding on n ACK/NACK signals for the n CWs. For example, one ACK/NACK signal has a length of 1 bit, and channel coding is performed on n bits for the n ACK/NACK signals. Various channel coding schemes can be used.

In a first embodiment for channel coding, repetition coding can be used. For example, in uplink SU-MIMO, if the maximum possible number of CWs is 2, a 2-bit ACK/NACK signal is repeated m times according to a code rate 1/m used in PHICH coding. When the code rate 1/m=1/3, CWs for 2-bit information bits for two ACK/NACK signals are as follows.

TABLE 2

| 2 ACK/NACK signals | Codeword | Weight | Minimum Distance |
|---|---|---|---|
| 00 | 000000 | 0 | 3 |
| 01 | 010101 | 3 | |
| 10 | 101010 | 3 | |
| 11 | 111111 | 6 | |

In a second embodiment for channel coding, a simplex code can be used. For example, in order to perform coding on the 2-bit information bits for the two ACK/NACK signals at a PHICH code rate 1/3, coding can be performed by using a simplex code of (3, 2) and the generated code can be repeated to generate a codeword. The following table shows an example of the generated codeword.

TABLE 3

| 2 ACK/NACK signals | Codeword | Weight | Minimum Distance |
|---|---|---|---|
| 00 | 000000 | 0 | 4 |
| 01 | 011011 | 4 | |
| 10 | 101101 | 4 | |
| 11 | 110110 | 4 | |

The example of Table 3 has an advantage in that a minimum distance increases in comparison with the example of Table 2.

In a third embodiment for channel coding, block coding can be used. When the code rate is 1/m, a codeword $b_i$ (i=0, ..., mn−1) for information bits $a_k$ (k=0, ..., n−1) having n bits for n ACK/NACK signals can be generated by the following equation.

$$b_i = \sum_{k=0}^{n-1}(a_k \times M_{i,k}) \bmod 2 \quad \text{[Equation 3]}$$

Herein, if n=2 and m=3, a basis sequence $M_{i,k}$ can be defined by the following table.

TABLE 4

| i | $M_{i,0}$ | $M_{i,1}$ |
|---|---|---|
| 0 | 1 | 0 |
| 1 | 0 | 1 |
| 2 | 1 | 1 |
| 3 | 0 | 0 |
| 4 | 1 | 0 |
| 5 | 0 | 1 |

For example, a codeword generated by using two ACK/NACK signals according to the code rate 1/3 is as follows.

TABLE 5

| 2 ACK/NACK signals | Codeword | Weight | Minimum Distance |
|---|---|---|---|
| 00 | 000000 | 0 | 3 |
| 01 | 101010 | 3 | |
| 10 | 011001 | 3 | |
| 11 | 110011 | 4 | |

In step S530, the generated codeword for the ACK/NACK signals is mapped to complex-valued modulation symbols on a signal constellation according to a modulation scheme. Similarly to the existing LTE system, BPSK may be used as the modulation scheme. In this case, the number of PHICHs that can be multiplexed to one PHICH group may be increased by directly using the existing I/Q multiplexing concept. Alternatively, spectral efficiency may be increased by using a modulation scheme having a higher order than the BPSK. For example, quadrature phase shift keying (QPSK) may be used as the modulation scheme.

In step S540, the modulation symbols are spread by using orthogonal sequences and are then mapped to resources. An example of determining an index pair ($n^{group}_{PHICH}$, $n^{seq}_{PHICH}$) for resource mapping will be described below in detail. The codeword length or the modulation scheme is for exemplary purposes only, and thus may vary depending on the number of maximum codewords and a code rate in uplink SU-MIMO.

(1) When using 6-bit codeword, QPSK, and SF=4

When a codeword has a length of 6 bits, the codeword is mapped to 3 modulation symbols by using QPSK modulation. When the 3 modulation symbols are spread by using SF=4, 12 spreading symbols are generated. When using QPSK modulation, I/Q multiplexing used in the existing LTE system cannot be used, and thus up to 4 PHICHs can be multiplexed to one PHICH. Since the same SF used in the existing LTE system is used, the same orthogonal sequence can be used. Therefore, to distinguish a UE using uplink SU-MIMO from a UE not supporting uplink SU-MIMO, PHICH resources can be assigned by using the following equation.

$$n_{PHICH}^{group} = (I_{PRB\_RA}^{lowest\_index} + n_{DMRS}) \bmod N_{PHICH}^{group}$$

$$n_{PHICH}^{seq} = (\lfloor I_{PRB\_RA}^{lowest\_index}/N_{PHICH}^{group} \rfloor + n_{DMRS}) \bmod N_{SF}^{PHICH} \quad \text{[Equation 4]}$$

According to the above equation, an I-phase orthogonal sequence is assigned to the UE using the UL-MIMO.

A resource element group (REG) may be used to map spreading symbols to physical resources. The REG includes a plurality of contiguous resource elements. In a time domain and/or a frequency domain, REGs are mapped to physical resources in a distributed manner. That is, the REG denotes a unit of contiguous resource elements, and by mapping the REGs in a distributed manner according to a specific pattern, time/frequency selectivity increases.

Figure 10:
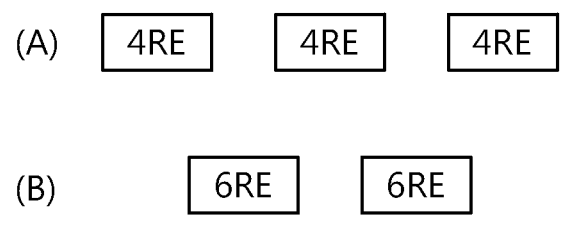

FIG. 10 shows an example of resource mapping when SF=4. One box indicates an REG. The subfigure (A) of FIG. 10 shows a case where one REG includes 4 contiguous resource elements (REs), and the subfigure (B) of FIG. 10 shows a case where one REG includes 6 contiguous REs.

In another embodiment, when using QPSK modulation and SF=4, an amount of physical resources occupied by a PHICH is the same as that of the existing LTE system, but since I/Q multiplexing cannot be used, the number of PHICHs multiplexed to one PHICH group becomes equal to an SF value. Therefore, in order to compensate for the decreased PHICH capacity, $N^{group}_{PHICH}$ can be determined as follows.

$$N^{group}_{PHICH} = \begin{cases} 2 \cdot \lceil N_g(N^{DL}_{RB}/8) \rceil & \text{for normal cyclic prefix} \\ 4 \cdot \lceil N_g(N^{DL}_{RB}/8) \rceil & \text{for extended cyclic prefix} \end{cases} \quad \text{[Equation 5]}$$

or $$N^{group}_{PHICH\_MCW} = 2 \cdot N^{group}_{PHICH}$$

Herein, $N^{group}_{PHICH\_MCW}$ denotes the number of PHICH groups, calculated by the UE using uplink SU-MIMO.

Alternatively, in order to ensure the number of PHICH groups, a value $N_g$ used for calculation of $N^{group}_{PHICH}$ can be changed. Herein, $N_g$ is 2-bit information transmitted on a broadcast channel. Unlike the existing value $N_g \in \{1/6, 1/2, 1, 2\}$, an extended value such as $N_g \in \{1/2, 1, 2, 4\}$ can be used as the value $N_g$.

(2) When using 6-bit codeword, QPSK, and SF=8

When a codeword has a length of 6 bits, the codeword is mapped to 3 modulation symbols by using QPSK modulation. When the 3 modulation symbols are spread by using SF=8, 24 spreading symbols are generated. Since the conventional LTE system does not support SF=8, an orthogonal sequence having a length of 8 is required. Various sequences having a good correlation can be used as the orthogonal sequence having a length of 8. The orthogonal sequence may be a well-known Zadoff-Chu (ZC) sequence or a pseudo-noise (PN) sequence. Alternatively, the orthogonal sequence may be a new sequence generated by performing extension or truncation on one of the sequences as a basis sequence.

FIG. 11 shows an example of resource mapping when SF=8. One box indicates an REG. The subfigure (A) of FIG. 11 shows a case where one REG includes 4 contiguous REs, and the subfigure (B) of FIG. 11 shows a case where one REG includes 8 contiguous REs. The subfigure (C) of FIG. 11 shows a case where 4 contiguous REs constitute one REG, and two REGs are grouped into one group and are mapped in a group unit. The subfigure (D) of FIG. 11 shows a case where one REG includes 6 contiguous REs.

The reason of configuring one REG by using 4 REs is to assign PHICH resources in a compatible manner with the existing UE not using uplink SU-MIMO. The reason of configuring one REG by using 6 or 8 REs is to support up to 6 or 8 antenna ports used in downlink transmission. The reason of using two REGs in resource mapping in a group unit by grouping the two REGs into one group is to support PHICH resource assignment while maintaining compatibility with the existing UE not supporting uplink SU-MIMO.

(3) When using 6-bit codeword, BPSK, and SF=4

When a codeword has a length of 6 bits, the codeword is mapped to 6 modulation symbols by using BPSK modulation. When the 6 modulation symbols are spread by using SF=4, 24 spreading symbols are generated. Therefore, when using I/Q multiplexing, up to 8 (SF×2) PHICHs can be multiplexed to one PHICH group. The SF used in the existing LTE system is maintained, and the same orthogonal sequence can be used.

FIG. 12 shows an example of resource mapping when SF=4. One box indicates an REG. The subfigure (A) of FIG. 12 shows a case where one REG includes 4 contiguous REs, and the subfigure (B) of FIG. 12 shows a case where one REG includes 8 contiguous REs. The subfigure (C) of FIG. 12 shows a case where 4 contiguous REs constitute one REG, and two REGs are grouped into one group and are mapped in a group unit. The subfigure (D) of FIG. 12 shows a case where one REG includes 6 contiguous REs.

(3) When using 6-bit codeword, BPSK, and SF=2

When a codeword has a length of 6 bits, the codeword is mapped to 6 modulation symbols by using BPSK modulation. When the 6 modulation symbols are spread by using SF=2, 12 spreading symbols are generated. Therefore, when using I/Q multiplexing, up to 4 (SF×2) PHICHs can be multiplexed to one PHICH group. The SF used in the existing LTE system is maintained, and the same orthogonal sequence can be used.

Figure 13:
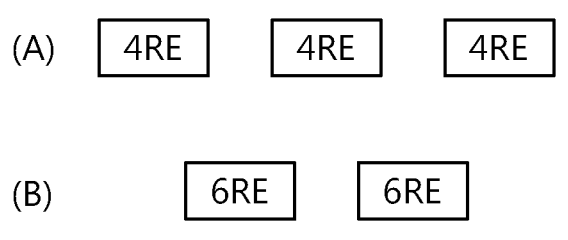

FIG. 13 shows an example of resource mapping when SF=2. One box indicates an REG. The subfigure (A) of FIG. 13 shows a case where one REG includes 4 contiguous REs, and the subfigure (B) of FIG. 13 shows a case where one REG includes 6 contiguous REs.

Returning to FIG. 9, in step S550, the BS transmits n ACK/NACK signals through one PHICH.

<Separate Coding>

Hereinafter, a method capable of transmitting a plurality of ACK/NACK signals through a plurality of PHICHs by performing separate coding on the respective ACK/NACK signals for multiple codewords will be described. That is, according to the separate coding, one ACK/NACK signal for one codeword is transmitted on one PHICH.

In order to assign a plurality of PHICHs to one UE, a plurality of PHICH resources can be assigned by using three types of combination, i.e., (the same PHICH group, a different sequence index), (a different PHICH group, a different sequence index), and (a different PHICH group, the same sequence index). One of the three types of combination may be designated for use, or one of the three types of combination may be selectively used.

When using the separate coding, n ACK/NACK signals for n codewords are transmitted on n PHICHs. Even if the n codewords are transmitted on a PUSCH in uplink SU-MIMO in PHICH resource assignment, $I^{lowest\_index}_{PRB\_RA}$ which denotes the lowest PRB index of a resource used in the PUSCH can be used in the same concept. In order to assign the plurality of PHICH resources by using the $I^{lowest\_index}_{PRB\_RA}$ and the $n_{DMRS}$ similarly to the existing LTE system, if the $I^{lowest\_index}_{PRB\_RA}$ is identical, a different $n_{DMRS}$ needs to be used for each PHICH resource. However, since a cyclic shift of a DMRS is not assigned for each codeword but is assigned for each antenna port in the existing LTE system, it is difficult to assign the $n_{DMRS}$ for each codeword. This implies that it is impossible to assign the plurality of PHICH resources to one UE when the PHICH resources are assigned by using only the $I^{lowest\_index}_{PRB\_RA}$ and the $n_{DMRS}$ similarly to the existing LTE system. This is because the UE cannot distinguish the PHICH when two or more PHICHs use the same $I^{lowest\_index}_{PRB\_RA}$ and the same $n_{DMRS}$.

Therefore, the following methods are proposed in order to assign a plurality of PHICHs to a plurality of codewords.

In a first method of assigning the plurality of PHICHs to the plurality of codewords, a codeword-specific parameter for differently assigning PHICH resources for the respective codewords can be used. In order to assign the plurality of PHICHs to one UE, three types of combination can be used, such as (the same PHICH group, a different sequence index), (a different PHICH group, a different sequence index), and (a different PHICH group, the same sequence index).

When using (the same PHICH group, a different sequence index), the codeword-specific parameter can be used to assign a sequence index $n^{seq}_{PHICH}$. When using (a different PHICH group, a different sequence index), the codeword-specific parameter can be used to assign the sequence index $n^{seq}_{PHICH}$ and/or a PHICH group number $n^{group}_{PHICH}$. When using (a different PHICH group, the same sequence index), the codeword-specific parameter can be used to assign the PHICH group number $n^{group}_{PHICH}$.

The codeword-specific parameter is used to distinguish a plurality of PHICH resources used for a UE supporting uplink SU-MIMO. The codeword-specific parameter can be defined variously irrespective of its format and content as long as it is a parameter having a different characteristic or value for each codeword or each PHICH.

As one example of the codeword-specific parameter, a modulation and coding scheme (MCS) and/or a redundancy version can be used. This is because a plurality of codewords can have different MCSs, and can have different redundancy versions at HARQ retransmission. The MCS and the redundancy version are parameters reported when the BS assigns resources to the UE in uplink, and can be assigned for each codeword. When a codeword-specific parameter for an $i^{th}$ codeword is denoted by M(i), an index pair ($n^{group}_{PHICH}$, $n^{seq}_{PHICH}$) for assigning a plurality of PHICH resources can be determined as follows.

When the plurality of PHICH resources have (the same PHICH group, a different sequence index), the index pair can be determined by the following equation.

$$n_{PHICH}^{group}(i) = \{I_{PRB\_RA}^{lowest\_index} + n_{DMRS}\} \bmod N_{PHICH}^{group}$$

$$n_{PHICH}^{seq}(i) = \{\lfloor I_{PRB\_RA}^{lowest\_index}/N_{PHICH}^{group}\rfloor + n_{DMRS} + M(i)\} \bmod 2N_{SF}^{PHICH} \quad \text{[Equation 6]}$$

When the plurality of PHICH resources have (a different PHICH group, a different sequence index), the index pair can be determined by the following equation.

$$n_{PHICH}^{group}(i) = \{I_{PRB\_RA}^{lowest\_index} + n_{DMRS} + M(i)\} \bmod N_{PHICH}^{group}$$

$$n_{PHICH}^{seq}(i) = \{\lfloor I_{PRB\_RA}^{lowest\_index}/N_{PHICH}^{group}\rfloor + n_{DMRS} + M(i)\} \bmod 2N_{SF}^{PHICH} \quad \text{[Equation 7]}$$

When the plurality of PHICH resources have (a different PHICH group, the same sequence index), the index pair can be determined by the following equation.

$$n_{PHICH}^{group}(i) = \{I_{PRB\_RA}^{lowest\_index} + n_{DMRS} + M(i)\} \bmod N_{PHICH}^{group}$$

$$n_{PHICH}^{seq}(i) = \{\lfloor I_{PRB\_RA}^{lowest\_index}/N_{PHICH}^{group}\rfloor + n_{DMRS}\} \bmod 2N_{SF}^{PHICH} \quad \text{[Equation 8]}$$

As another example of the codeword-specific parameter, a PHICH assignment parameter can be used. The PHICH assignment parameter is a parameter unique for each PHICH resource in order to assign a plurality of PHICH resources. The PHICH assignment parameter can be reported by the BS to the UE as a part of uplink resource assignment for multi-codeword transmission. The PHICH assignment parameter can be determined to have a different value for each codeword.

When a codeword-specific parameter for an $i^{th}$ codeword is denoted by M(i), an index pair ($n^{group}_{PHICH}$, $n^{seq}_{PHICH}$) for assigning a plurality of PHICH resources can be determined as follows.

When the plurality of PHICH resources have (the same PHICH group, a different sequence index), the index pair can be determined by the following equation.

$$n_{PHICH}^{group}(i) = \{I_{PRB\_RA}^{lowest\_index} + n_{DMRS}\} \bmod N_{PHICH}^{group}$$

$$n_{PHICH}^{seq}(i) = \{\lfloor I_{PRB\_RA}^{lowest\_index}/N_{PHICH}^{group}\rfloor + n_{DMRS} + N(i)\} \bmod 2N_{SF}^{PHICH} \quad \text{[Equation 9]}$$

When the plurality of PHICH resources have (a different PHICH group, a different sequence index), the index pair can be determined by the following equation.

$$n_{PHICH}^{group}(i) = \{I_{PRB\_RA}^{lowest\_index} + n_{DMRS} + N(i)\} \bmod N_{PHICH}^{group}$$

$$n_{PHICH}^{seq}(i) = \{\lfloor I_{PRB\_RA}^{lowest\_index}/N_{PHICH}^{group}\rfloor + n_{DMRS} + N(i)\} \bmod 2N_{SF}^{PHICH} \quad \text{[Equation 10]}$$

When the plurality of PHICH resources have (a different PHICH group, the same sequence index), the index pair can be determined by the following equation.

$$n_{PHICH}^{group}(i) = \{I_{PRB\_RA}^{lowest\_index} + n_{DMRS} + N(i)\} \bmod N_{PHICH}^{group}$$

$$n_{PHICH}^{seq}(i) = \{\lfloor I_{PRB\_RA}^{lowest\_index}/N_{PHICH}^{group}\rfloor + n_{DMRS}\} \bmod 2N_{SF}^{PHICH} \quad \text{[Equation 11]}$$

As a second method for assigning a plurality of PHICHs to a plurality of codewords, a relation between the codewords and antenna ports can be used. In a MIMO system, the number of antenna ports is always equal to or greater than the number of codewords. Therefore, a cyclic shift $n_{DMRS}$ of a DMRS assigned to each antenna port is used for assignment of the plurality of PHICHs.

For example, if it is assumed that uplink transmission supports up to 4 antenna ports and up to 2 codewords, the codewords and the antenna ports can be related as shown in the following table.

TABLE 6

| Number of codeword | Number of layers | Number of antenna ports |
|---|---|---|
| 2 | 2 | 2, 4 |
| 2 | 3 | 4 |
| 2 | 4 | 4 |

When the number of codewords is equal to the number of antenna ports, a PHICH resource can be assigned for each codeword by using the cyclic shift $n_{DMRS}$ of the DMRS assigned to the antenna port having the same index as the codeword index. The following equation shows a method of determining the index pair ($n^{group}_{PHICH}(i)$, $n^{seq}_{PHICH}(i)$) of the $i^{th}$ codeword by using the cyclic shift $n_{DMRS}$.

$$n_{PHICH}^{group}(i) = \{I_{PRB\_RA}^{lowest\_index} + n_{DMRS}(j)\} \bmod N_{PHICH}^{group}, j=i$$

$$n_{PHICH}^{seq}(i) = \{\lfloor I_{PRB\_RA}^{lowest\_index}/N_{PHICH}^{group}\rfloor + n_{DMRS}(j)\} \bmod 2N_{SF}^{PHICH}, j=i \quad \text{[Equation 12]}$$

Herein, i denotes a codeword index, j denotes an antenna port index, and $n_{DMRS}(j)$ denotes a cyclic shift of a DMRS assigned to a $j^{th}$ antenna port.

When the number of codewords is less than the number of antenna ports, the PHICH resource can be assigned for each codeword by using a cyclic shift $n_{DMRS}$ of a DMRS assigned to an antenna port always having the same index as the codeword index. In this case, the index pair ($n^{group}_{PHICH}(i)$, $n^{seq}_{PHICH}(i)$) can be determined similarly to the example of Equation 12 above.

When the number of codewords is less than the number of antenna ports, a cyclic shift $n_{DMRS}(j)$ of a DMRS assigned to another $j^{th}$ antenna port can be determined for each codeword by determining an equation indicating a relation between a codeword index i and an antenna port index j. In this case, an index pair of $(n^{group}_{PHICH}(i), n^{seq}_{PHICH}(i))$ of the $i^{th}$ codeword can be determined by the following equation.

$$n_{PHICH}^{group}(i)=\{I_{PRB\_RA}^{lowest\_index}+n_{DMRS}(j)\} \bmod N_{PHICH}^{group}$$

$$n_{PHICH}^{seq}(i)=\{\lfloor I_{PRB\_RA}^{lowest\_index}/N_{PHICH}^{group}\rfloor + n_{DMRS}(j)\} \bmod 2N_{SF}^{PHICH} \quad \text{[Equation 13]}$$

For example, the relation between i and j can be determined such as j=2i, j=2i+1, j=i+1, and j=i+2. However, this is for exemplary purposes only, and thus various methods can be used to determine the relation between i and j by the use of an operation such as a modulo operation or a variable such as the maximum number of codewords.

Alternatively, when the cyclic shift of the DMRS is assigned according to a location of a DMRS for each antenna port, the relations between the codeword index and the antenna port index can be combined to be used in PHICH resource assignment.

Figure 14:
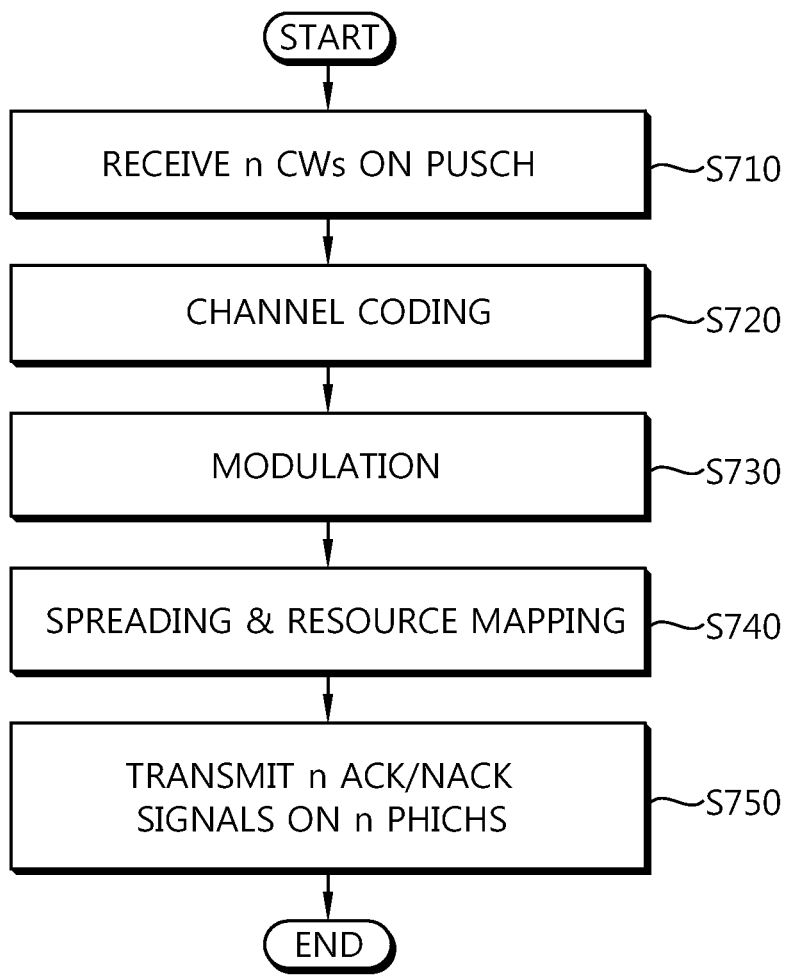
FIG. 14 is a flowchart showing a method of performing HARQ according to an embodiment of the present invention.

FIG. 14 is a flowchart showing a method of performing HARQ according to an embodiment of the present invention. This method can be performed by a BS. In step S710, the BS receives n (n>1) codewords (CWs) from a UE through a PUSCH.

In step S720, the BS performs channel coding separately on n ACK/NACK signals for the n CWs. For example, one ACK/NACK signal has a length of 1 bit, and channel coding is performed separately on n bits for the n ACK/NACK signals. Various channel coding schemes can be used. When a code rate is 1/3, an example of repetition coding for the 1-bit ACK/NACK signal is shown in the following table.

TABLE 7

| ACK/NACK signal | Codeword | Weight | Minimum Distance |
|---|---|---|---|
| 0 | 000 | 0 | 3 |
| 1 | 111 | 3 | |

In step S730, a codeword for each ACK/NACK signal is mapped to complex-valued modulation symbols on a signal constellation according to a modulation scheme. If BPSK is used as the modulation scheme similarly to the existing LTE system, the number of PHICHs that can be multiplexed to one PHICH group may be increased by directly using the existing I/Q multiplexing concept. Alternatively, spectral efficiency may be increased by using a modulation scheme having a higher order than the BPSK. For example, QPSK may be used as the modulation scheme.

In step S740, the modulation symbols are spread by using orthogonal sequences and are then mapped to resources. An example of determining an index pair $(n^{group}_{PHICH}, n^{seq}_{PHICH})$ for resource mapping will be described below in detail. The codeword length or the modulation scheme is for exemplary purposes only, and thus may vary depending on the number of maximum codewords and a code rate in uplink SU-MIMO.

(1) When using 3-bit codeword, BPSK, and SF=8

When a codeword for one ACK/NACK signal has a length of 3 bits, the codeword is mapped to 3 modulation symbols by using BPSK. When the 3 modulation symbols are spread by using SF=8, 24 spreading symbols are generated. When using I/Q multiplexing, up to 16 (SF×2) PHICHs can be multiplexed to one PHICH group. However, in order to perform spreading with SF=8, an orthogonal sequence having a length of 8 is required. Various sequences having a good correlation can be used as the orthogonal sequence having a length of 8. The orthogonal sequence may be a well-known ZC sequence or a PN sequence. Alternatively, the orthogonal sequence may be a new sequence generated by performing extension or truncation on one of the sequences as a basis sequence.

FIG. 15 shows an example of resource mapping when SF=8. One box indicates an REG. The subfigure (A) of FIG. 15 shows a case where one REG includes 4 contiguous REs, and the subfigure (B) of FIG. 15 shows a case where one REG includes 8 contiguous REs. The subfigure (C) of FIG. 15 shows a case where 4 contiguous REs constitute one REG, and two REGs are grouped into one group and are mapped in a group unit. The subfigure (D) of FIG. 15 shows a case where one REG includes 6 contiguous REs.

(2) When using 3-bit codeword, BPSK, and SF=4

When a codeword for one ACK/NACK signal has a length of 3 bits, the codeword is mapped to 3 modulation symbols by using BPSK modulation. When the 3 modulation symbols are spread by using SF=4, 12 spreading symbols are generated. When using I/Q multiplexing, up to 8 (SF×2) PHICHs can be multiplexed to one PHICH group. In doing so, there is an advantage in that an orthogonal sequence of the existing LTE system can be directly used.

Figure 16:
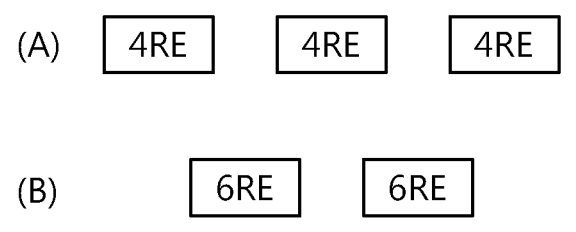

FIG. 16 shows an example of resource mapping when SF=4. One box indicates an REG. The subfigure (A) of FIG. 16 shows a case where one REG includes 4 contiguous REs, and the subfigure (B) of FIG. 16 shows a case where one REG includes 6 contiguous REs.

Returning to FIG. 14, in step S750, the BS transmits ACK/NACK signals to respective PHICHs.

When using separate coding, the number of PHICHs may be equal to the maximum number of codewords supported in uplink, and thus an amount of PHICH resources also increases to that extent. In uplink SU-MIMO, an amount of resources assigned to all of the PHICHs may be restricted.

As an example of restricting the PHICH resources, selection of $N_g$ used for calculation of $N^{group}_{PHICH}$ may be restricted. $N_g$ is 2-bit information transmitted on a broadcast channel, and is information related to a PHICH resource amount expressed by $N_g \in \{1/6, 1/2, 1, 2\}$. When using uplink MCW SU-MIMO, the value $N_g$ is limited to a maximum value among elements belonging to a selectable set, e.g., $N_g=2$. Alternatively, the value $N_g$ may be limitedly selected from some of great values among the elements belonging to the selectable set. For example, the value $N_g$ may be selected from a limited set such as $N_g \in \{1,2\}$.

As another example of restricting the PHICH resources, a PHICH duration may be limited to a specific region. The PHICH duration provides a lower limit in a size of a control region specified by a PCFICH. According to the section 6.9.3 of 3GPP TS 36.211 V8.2.0 (2008-03), the PHICH duration is divided into 'normal' and 'extended' as shown in the following table.

TABLE 8

| | Non-MBSFN subframes | | MBSFN subframes |
|---|---|---|---|
| PHICH duration | Subframes 1 and 6 in case of frame structure type 2 | All other cases | On a carrier supporting both PDSCH and PMCH |
| Normal | 1 | 1 | 1 |
| Extended | 2 | 3 | 2 |

In case of MCW SU-MIMO, the PHICH duration may be restricted to use only 'extended' always as shown in the following table.

TABLE 9

| PHICH duration | | Non-MBSFN subframes | | MBSFN subframes |
|---|---|---|---|---|
| | | Subframes 1 and 6 in case of frame structure type 2 | All other cases | On a carrier supporting both PDSCH and PMCH |
| SIMO/ SCW SU-MIMO | Normal | 1 | 1 | 1 |
| | Extended | 2 | 3 | 2 |
| MCW SU-MIMO | Extended | 2 | 3 | 2 |

This can be reported through a broadcast channel. A UE using MCW SU-MIMO may be restricted to use only 'extended' always.

As another example of restricting PHICH resources, a control region, i.e., a region to which control channels are assigned in a subframe, can be assigned by a designated region at MCW SU-MIMO transmission. For example, as disclosed in the section 6.7 of 3GPP TS 36.211 V8.2.0 (2008-03), the PCFICH indicates the maximum number of OFDM symbols used in the control region in the subframe as shown in the following table.

TABLE 10

| Subframe | Number of OFDM symbols for PDCCH |
|---|---|
| Subframe 1 and 6 for frame structure type 2 | 1, 2 |
| MBSFN subframes on a carrier supporting both PMCH and PDSCH | 1, 2 |
| MBSFN subframes on a carrier not supporting PDSCH | 0 |
| All other subframes | 1, 2, 3 |

The PHICH is transmitted in any subframe within a time period corresponding to the number of OFDM symbols across which the PDCCH is transmitted. That is, if the PCFICH indicates k OFDM symbols, the PHICH can be transmitted only within the k OFDM symbols. In order to support the increased PHICH amount when using uplink MCW SU-MIMO, the PCFICH can be restricted to assign a maximum value (e.g., k=3) always. In a narrowband system having not many available PRBs, there may be a restriction to assign only a maximum value (k≧3) of a PCFICH used differently from other system bandwidths at a corresponding system bandwidth.

Figure 17:
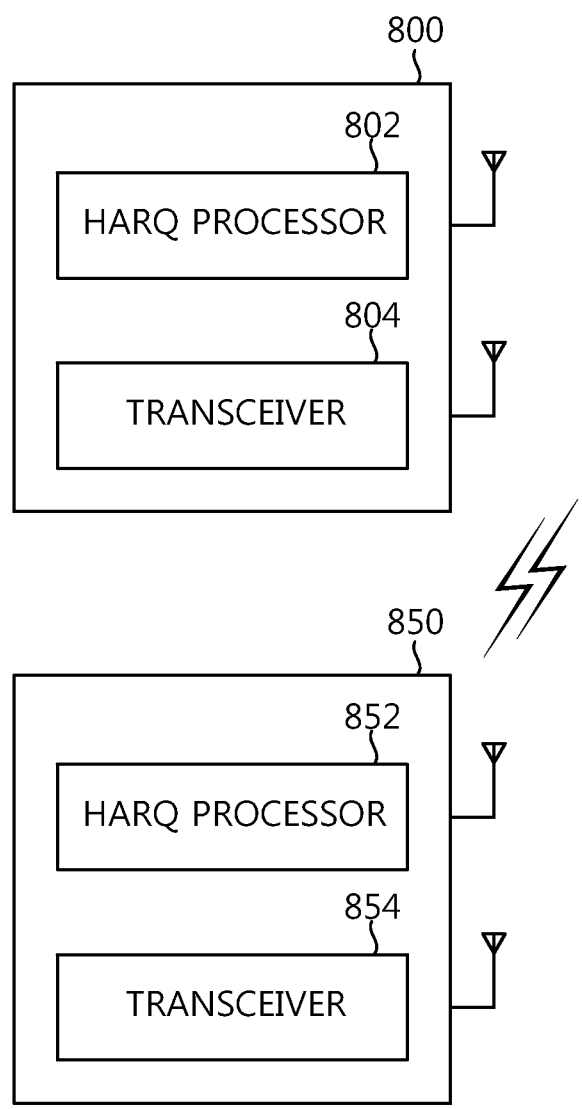
FIG. 17 shows a wireless communication system having multiple antennas according to an embodiment of the present invention.

FIG. 17 shows a wireless communication system having multiple antennas according to an embodiment of the present invention. ABS 800 includes an HARQ processor 802 and a transceiver 804. The transceiver 804 transmits and/or receives a radio signal through multiple antennas. The HARQ processor 802 performs HARQ. The HARQ processor 802 checks for an error for a plurality of codewords received from a UE 850, and generates an ACK/NACK signal thereof. Further, the HARQ processor 802 configures a PHICH for transmitting the generated ACK/NACK signal. The PHICH can be configured by using the aforementioned joint coding or separate coding.

The UE 850 includes an HARQ processor 852 and a transceiver 854. The transceiver 854 transmits and/or receives a radio signal through multiple antennas. The HARQ processor 852 configures multiple codewords, and transmits the multiple codewords through a PUSCH. Further, the HARQ processor 852 may receive an ACK/NACK signal for the multiple codewords from the BS 800, and thereafter perform HARQ retransmission.

The invention claimed is:

1. A method of performing hybrid automatic repeat request (HARQ) in a multiple-antenna system, the method comprising:

receiving, by a base station, a plurality of codewords through a physical uplink shared channel (PUSCH);

receiving, by the base station, a plurality of demodulation reference signals used to demodulate the plurality of codewords through a plurality of antenna ports, a cyclic shift of each demodulation reference signal being assigned based on an index of a corresponding antenna port; and transmitting, by the base station, a plurality of acknowledgment (ACK)/not-acknowledgment (NACK) signals for the plurality of codewords through a plurality of physical HARQ indicator channels (PHICHs), wherein a resource of a PHICH for a respective ACK/NACK signal is determined based on a lowest physical resource block index of a resource used in the PUSCH and a cyclic shift of a demodulation reference signal of a codeword corresponding to the respective ACK/NACK signal.

2. The method of claim 1, wherein the resource of the PHICH for i-th ACK/NACK signal is defined by an index pair $(n_{PHICH}^{group}(i), n_{PHICH}^{seq}(i))$ that is determined as:

$$n_{PHICH}^{group}(i) = \{I_{PRB\_RA}^{lowest\_index} + n_{DMRS}(j)\} \mod N_{PHICH}^{group}$$

$$n_{PHICH}^{seq}(i) = \{\lfloor I_{PRB\_RA}^{lowest\_index}/N_{PHICH}^{group}\rfloor + n_{DMRS}(j)\} \mod 2N_{SF}^{PHICH}$$

where $I_{PRB\_RA}^{lowest\_index}$ is the lowest physical resource block index of the resource used in the PUSCH, $n_{DMRS}(j)$ is the cyclic shift of the demodulation reference signal assigned to a j-th antenna port, $N_{PHICH}^{group}$ is a parameter and $N_{SF}^{PHICH}$ is a spreading factor.

3. A base station configured for performing hybrid automatic repeat request (HARQ) in a multiple-antenna system, the base station comprising:

a transceiver configured to:

receive a plurality of codewords through a physical uplink shared channel (PUSCH);

receive a plurality of demodulation reference signals used to demodulate the plurality of codewords through a plurality of antenna ports, a cyclic shift of each demodulation reference signal being assigned based on an index of a corresponding antenna port; and transmit a plurality of acknowledgment (ACK)/not-acknowledgment (NACK) signals for the plurality of codewords through a plurality of physical hybrid-ARQ indicator channels (PHICHs), a HARQ processor configured to determine a resource of a PHICH for a respective ACK/NACK signal based on a lowest physical resource block index of a resource used in the PUSCH and a cyclic shift of a demodulation reference signal of a codeword corresponding to the respective ACK/NACK signal.

4. A user equipment configured for performing hybrid automatic repeat request (HARQ) in a multiple-antenna system, the user equipment comprising:
  a transceiver configured to:
    transmit a plurality of codewords through a physical uplink shared channel (PUSCH);
    transmit a plurality of demodulation reference signals used to demodulate the plurality of codewords through a plurality of antenna ports, a cyclic shift of each demodulation reference signal being assigned based on an index of a corresponding antenna port; and
    receive a plurality of acknowledgment (ACK)/not-acknowledgment (NACK) signals for the plurality of codewords through a plurality of physical hybrid-ARQ indicator channels (PHICHs),
  a HARQ processor configured to determine a resource of a PHICH for a respective ACK/NACK signal based on a lowest physical resource block index of a resource used in the PUSCH and a cyclic shift of a demodulation reference signal of a codeword corresponding to the respective ACK/NACK signal.

\* \* \* \* \*